(12) United States Patent
Chien

(10) Patent No.: US 8,702,245 B2
(45) Date of Patent: Apr. 22, 2014

(54) LED LIGHT DEVICE HAVING A THREE-DIMENSIONAL IMAGE PROJECTION ASSEMBLY

(76) Inventor: Tseng-Lu Chien, Walnut, CA (US)

(*) Notice: Subject to any disclaimer, the term of this patent is extended or adjusted under 35 U.S.C. 154(b) by 160 days.

(21) Appl. No.: 13/021,107

(22) Filed: Feb. 4, 2011

(65) Prior Publication Data

US 2011/0122370 A1     May 26, 2011

(51) Int. Cl.
*G03B 21/00* (2006.01)
*G03B 21/20* (2006.01)
*H01R 33/00* (2006.01)

(52) U.S. Cl.
USPC .................................. 353/85; 353/7; 362/644

(58) Field of Classification Search
USPC ............. 353/85, 1, 7, 119, 122; 362/644, 341
See application file for complete search history.

(56) References Cited

U.S. PATENT DOCUMENTS

| | | | |
|---|---|---|---|
| 5,517,264 A * | 5/1996 | Sutton | 353/119 |
| 6,905,231 B2 * | 6/2005 | Dickie | 362/271 |
| 7,419,294 B2 * | 9/2008 | Lai | 362/641 |
| 7,438,446 B1 * | 10/2008 | McCann | 362/341 |
| 2007/0081423 A1 * | 4/2007 | Chien | 368/67 |
| 2010/0208357 A1 * | 8/2010 | Batchko et al. | 359/666 |

* cited by examiner

*Primary Examiner* — Georgia Y Epps
*Assistant Examiner* — Magda Cruz
(74) *Attorney, Agent, or Firm* — Bacon & Thomas, PLLC

(57) ABSTRACT

An LED projection light device includes an image forming assembly including a display and a projection assembly for generating and projecting three-dimensional images. The image forming and/or projection assembly may include a lenticular lens, slanted lenticular lens, switchable lenticular film, lenticular screen, parallax barrier The display may be controlled by a volumetric, multiplexed-2D to 3D, or parallax barrier technique, a single image splitter, a double image splitter, a spatial-multiplexer, time division multiplexer, or a tracking-based technique, and may include a 2D/3D switchable display, multiplanar display, ferroelectric LC display, cholestreric LC display, bi-stable nematic LC display, electrochromic films, OLED screen, OEL screen, reflective MEMS display, microcup electrophoretic display, or E-Ink display technical.

3 Claims, 8 Drawing Sheets

2D Multiplexed 3D Display = Autostereoscoping Display =

* Projection
* Parallax-Barrier
* Lenticular Lens
* Sub-Pixel Color filter
* Viewer- tracking
* Time Multiplexed Fig 5 [Physics Report]   PRIOR ART

3D image by Hologram

Real Object
-infinite number of view

Viewer

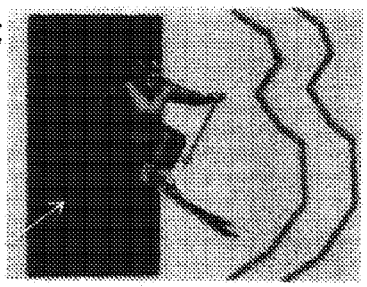

Holographic display
finite number of view

Apply Grating to make the wavefront need to present 3D image

Viewer

Fig 6 [Physics Report]   PRIOR ART

Volumetric 3D Display
Rotating Projection Screen
Acutuality System --- DLP projetor SDI Corporate R&D Center-CRT projector

Microretarder making process

Physcis Report

Super Size LED display

8mm LED pitch for 20m viewing- 2M thick
use of double Lenticilar lens to reduce the thickness
*** New thickness is 50 cm Physcis Report

Lenticular 3D LCD

Black Matrix of LCD will Cause dead wiew-zone

Physcis Report

Parallax Barrier 3D Display
Front Barrier Type

Physcis Report

Brightness-Moudulated-Depth system
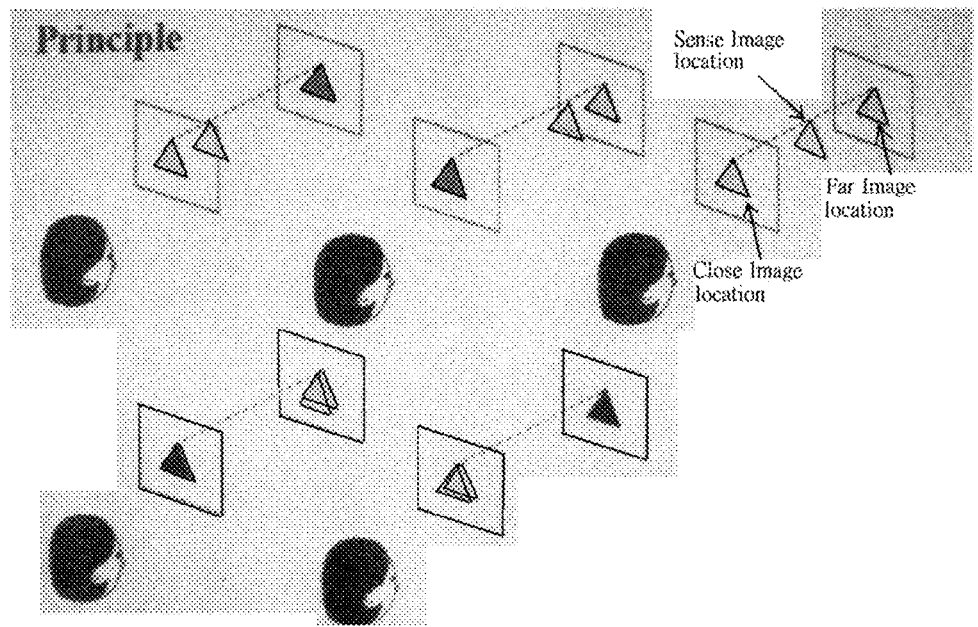
Fig 15 Physics Report
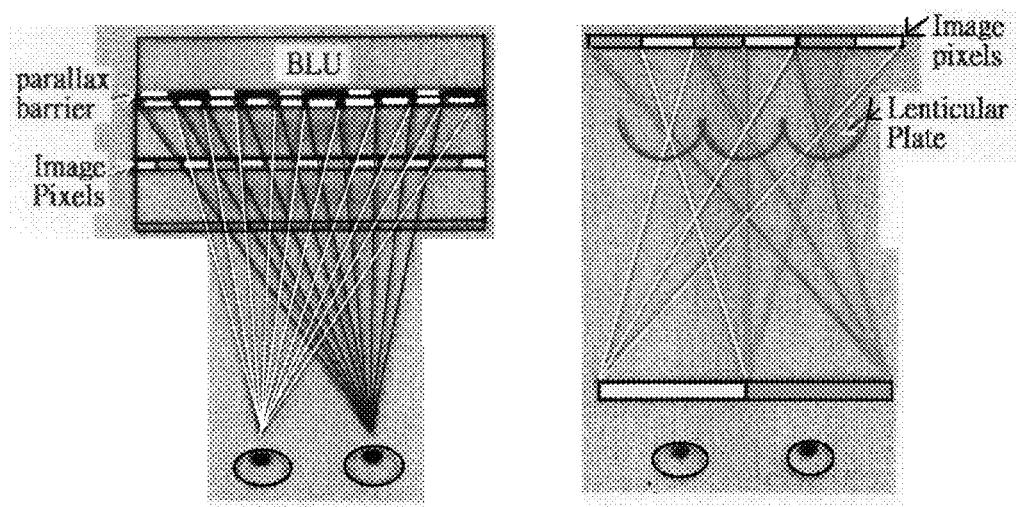
Fig 16 Physics Report

LED LIGHT DEVICE HAVING A THREE-DIMENSIONAL IMAGE PROJECTION ASSEMBLY

BACKGROUND OF THE INVENTION

This application has subject matter in common with the Inventor's U.S. patent application Ser. Nos. 12/948,953, 12/938,564, 12/886,832, 12/876,507, 12/771,003, 12/624,621, 12/914,584, 12/318,471, 12/318,470, 12/834,435, 12/292,153(now U.S. Pat. No. 7,871,192), Ser. No. 12/232,505 (now U.S. Pat. No. 7,832,917), and Ser. No. 12/318,473 (now U.S. Pat. No. 7,832,918).

The current invention provides improvements to the LED projection lights described in the above listed applications in order to provide a 3-dimensional presentation.

The Inventor's previous applications disclose incorporation of a hologram, laser, or grating optics means with an LED light source to project a 3 dimensional image. The present invention not only uses a hologram, laser, or grating, but also adds elements such as a lenticular lens, slanted lenticular lens, switchable lenticular film, lenticular screen, parallax barrier, volumetric technique, multiplexed-2D to 3D technique, single image splitter, double image splitter, spatial-multiplexing, time division-multiplexing, tracking, 2D/3D switchable display, multiplanar display, ferro-electric LC display, cholestreric LC display, bi-stable nematic LC display, electrochromic films, OLED screen, OEL screen, reflective MEMS display, microcup electrophoretic display, E-Ink display, and other techniques, skills, or methods to project a 3 dimensional image to any desired surface However, it will be appreciated that the any of the disclosures in the Inventor's U.S. patent applications or issued patents related to a laser, hologram, grating means, slide, film, screen, display, transparent means, and translucent means may also be applied to the present invention without necessarily departing from the scope of the present invention.

The present invention may be applied to a night light of the type disclosed in the Inventor's above-listed U.S. patent application Ser. Nos. 12/948,953, 12/938,564, 12/886,832, 12/876,507, 12/771,003, 12/624,621, 12/914,584, 12/318,471, 12/318,470, 12/834,435, 12/292,153 (U.S. Pat. No. 7,871,192), Ser. No. 12/232,505 (U.S. Pat. No. 7,832,917), and Ser. No. 12/318,473 (U.S. Pat. No. 7,832,918), the night light including at least one LED arranged as a light source to supply visible light beams; at least one optics means for projecting an image on a desired surface, the optics means selected from the group consisting of an optics lens, a convex or concave lens, telescope means, a film, a display unit, a transparent material, and a translucent material, the image being formed by light from the at least one LED passing thought transparent areas, openings, cut outs, grating means, or hologram means in the optics means, the image being selected from the group consisting of a message, data, a logo, a time, and any other image desired to be projected on the desired surface, and the desired surface being selected from the group consisting of a ceiling, a wall, a floor, and any other surface that is outside the night light; and at least one power source, circuit means, and trigger means arranged to cause the at least one LED to exhibit desired light functions, timing, colors, brightness, and illumination area, wherein the night light is arranged to be plugged into an electric outlet.

BRIEF DESCRIPTION OF THE DRAWINGS

FIGS. 3 to 16 explain the physical theory of 3 dimensional projection, as previously presented in the Inventor's prior U.S. Pat. Nos. 5,667,736 and 7,832,918 (for example, see column 1, lines 33 to 67, and column 2 of the '918 patent).

DETAILED DESCRIPTION OF THE PREFERRED EMBODIMENT

Figure 1:
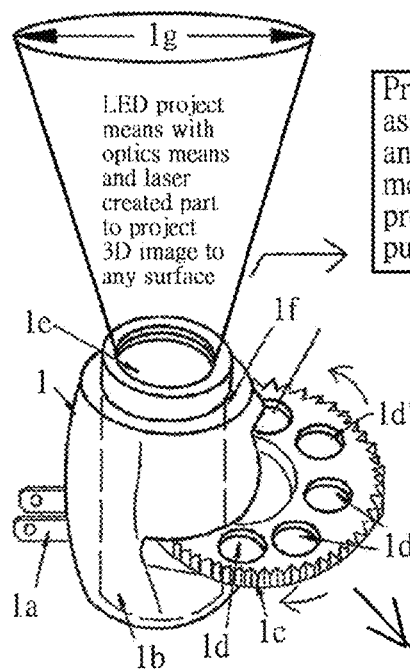
FIG. 1 shows a first preferred embodiment of an LED projection light device with a 3D dimension image having an adjustable focus, projection means; optics means; a display-unit(s), film, slide, or digital data display means; laser created means; lenticular means; barrier means; microretarder means; hologram means; color filter means; grating means; LED(s), a power source, circuit means, IC means, sensor means, switch means, gear means, motor means, movement means, and/or control means to cause the projected image to be very clear with 3 dimensional viewing effects.
Figure 2A:
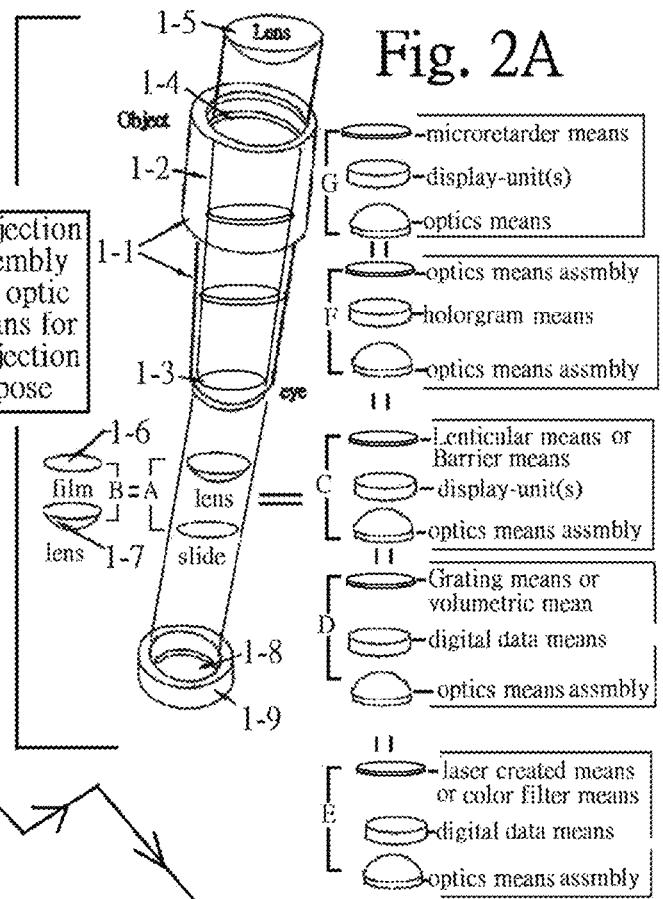
FIG. 2A shows the detailed construction of the first preferred embodiment.
Figure 2B:
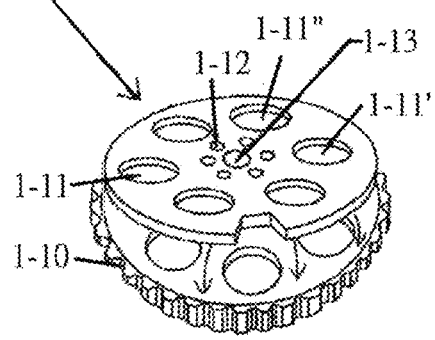
FIG. 2B shows further details of the construction of the first preferred embodiment.
Figure 3:
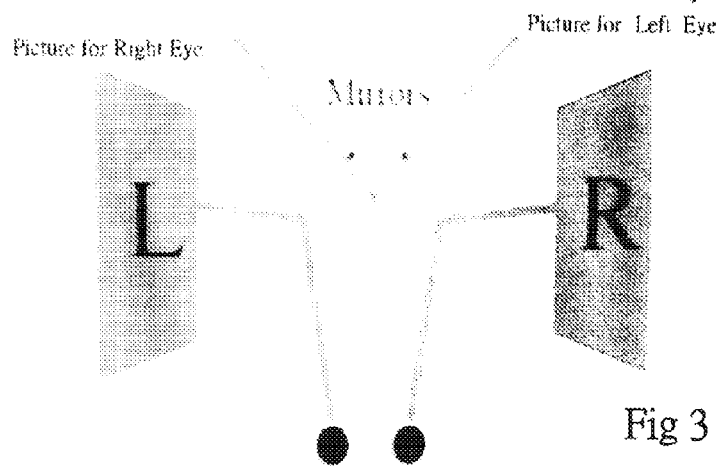
Figure 4:
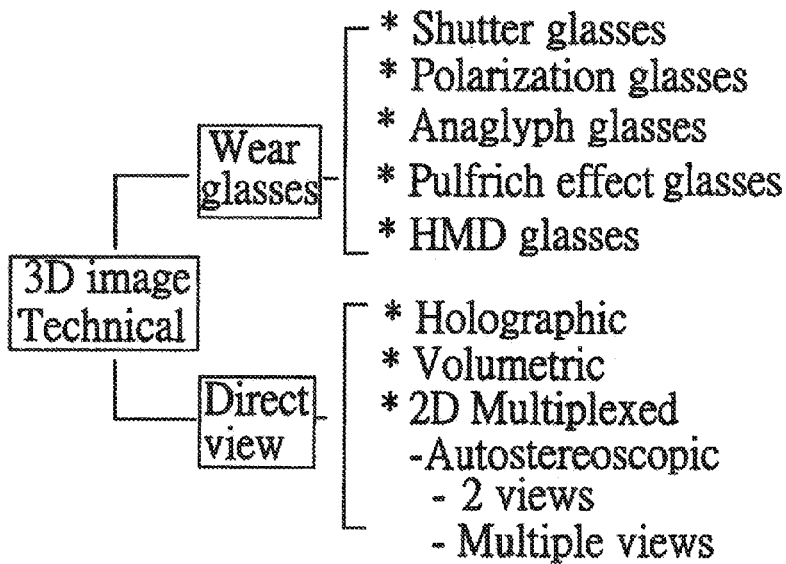
Figure 7:
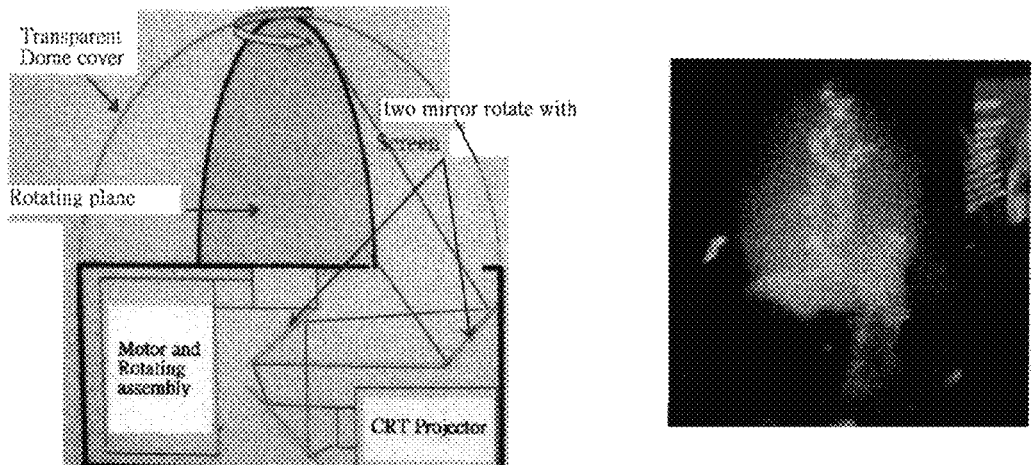
Figure 8:
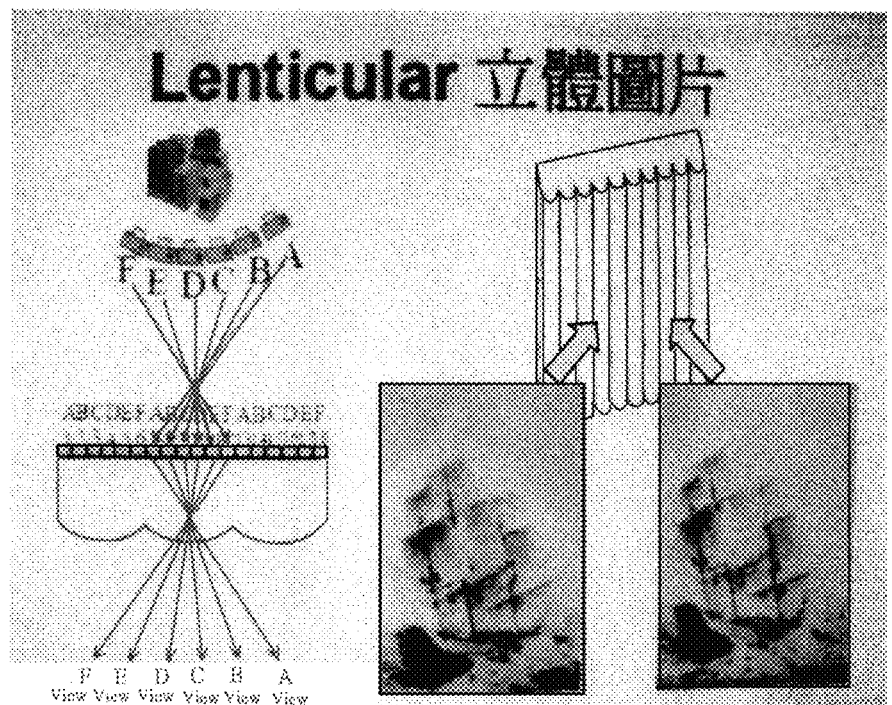
Figure 9:
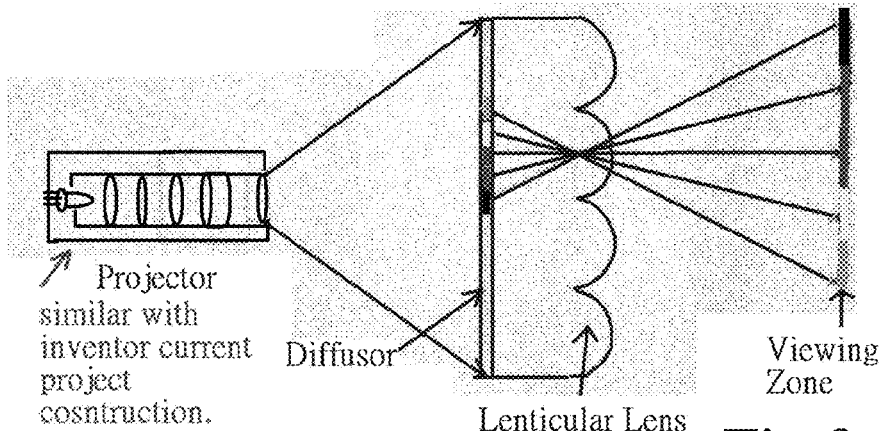
Figure 10:
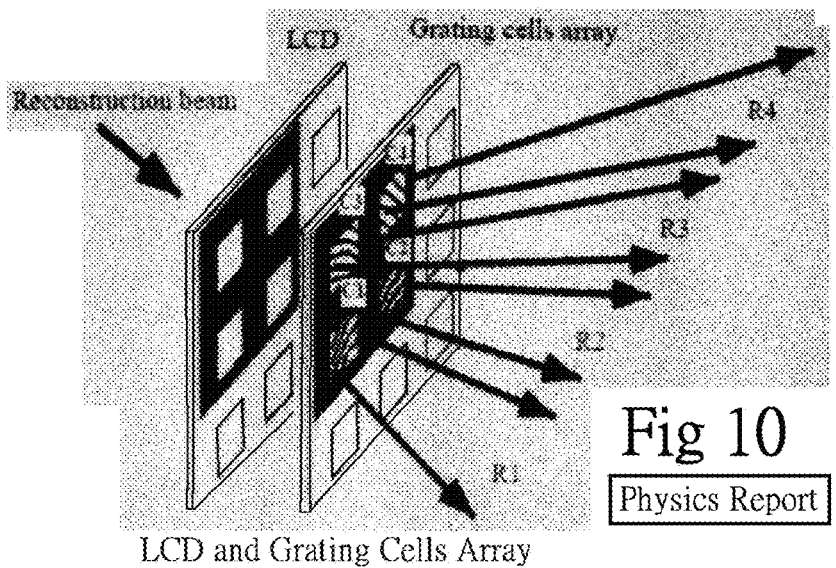
Figure 11:
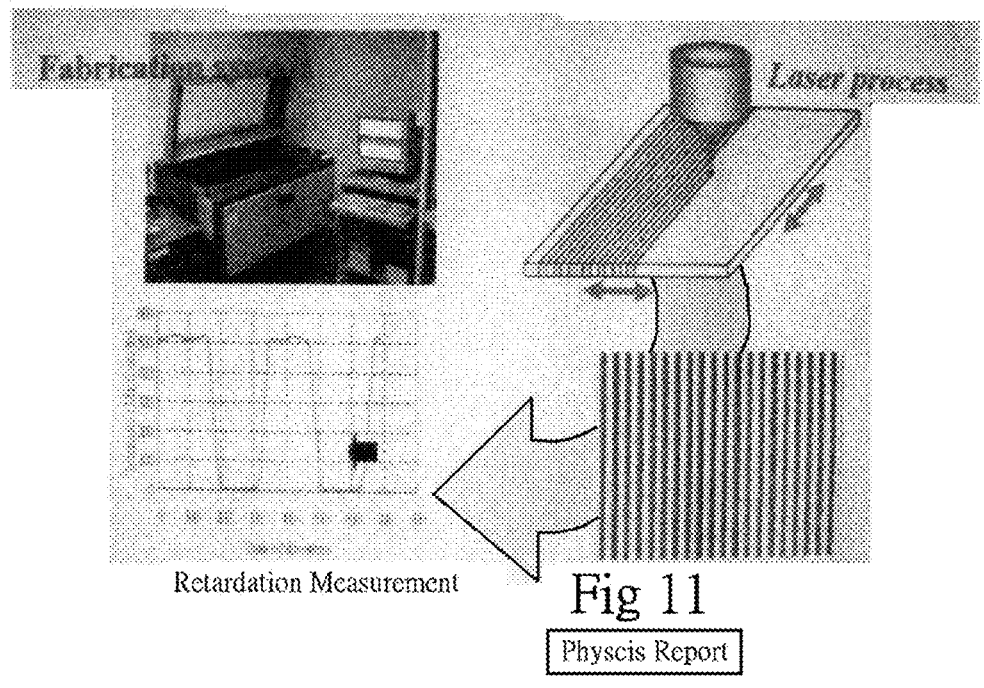
Figure 12:
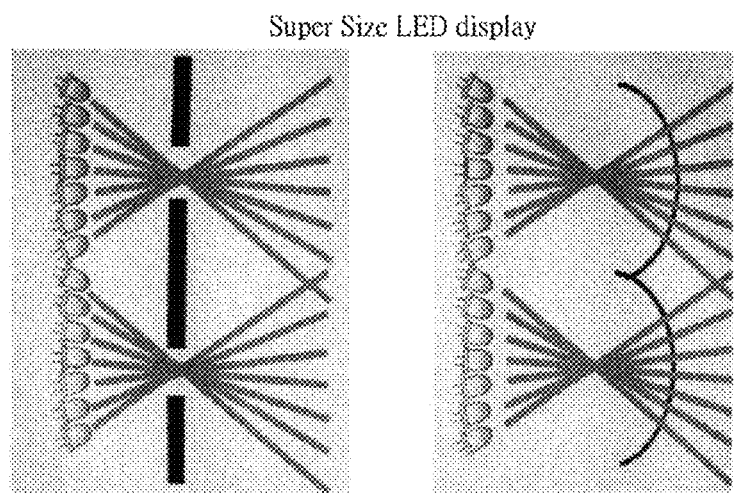
Figure 13:
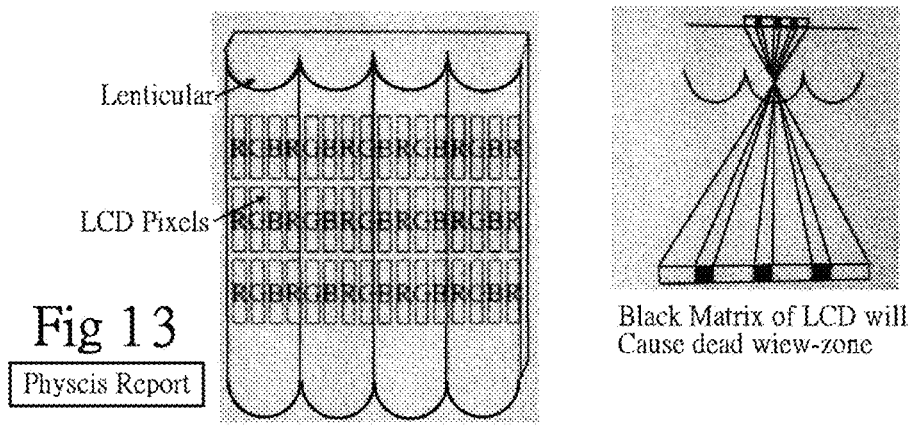
Figure 14:
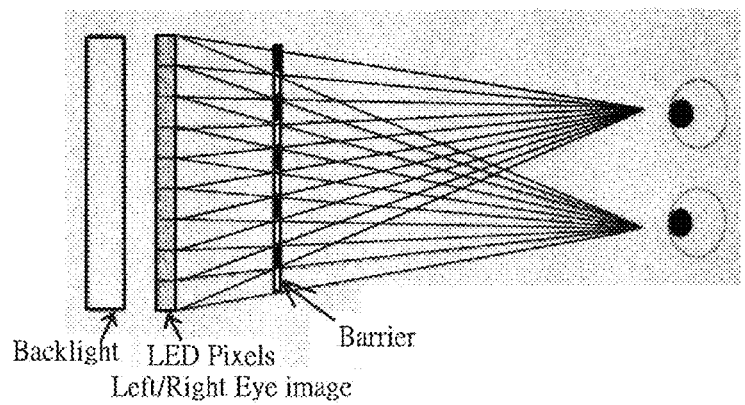

FIGS. 1, 2A, and 2B shows a preferred embodiment for an LED projection light device (1) for a 3D dimension image which has adjustable focus means (1e), projection means (1b), optics means (FIG. 2A—1-3, 1-5, 1-7), display-unit(s) (1d) (1d') (1d"), a film (FIG. 2A—1-6), a slide (FIG. 2A—slide), digital data display means (FIG. 2A—digital data means), laser created means (FIG. 2A—lenticular, barrier, hologram, grating), lenticular means (FIGS. 2A-C), barrier means (FIGS. 2A-C), microretarder means (FIGS. 2A-C), hologram means (FIGS. 2A-F), color filter means (FIGS. 2A-E), grating means (FIGS. 2A-D), LED(s) (not shown), a power source, circuit means, IC means, sensor means, switch means, gear means, motor means, movement means, and control means to cause the image to be very clear with 3 dimensional viewing effects.

The 3D image can be created as discussed above in accordance with the principles illustrated in FIGS. 3 to 16, using 3D techniques available from the marketplace and disclosed in the current inventor's prior U.S. Pat. No. 5,667,736, which is directed to a laser-created hologram, grating, or lenticular element, as well as the current inventor's U.S. Pat. No. 7,832,918 (see column 1, lines 33 to 67 and column 2).

FIG. 2A shows details of the construction of the embodiment of FIG. 1, including details of an adjustable focus, projection means, optics means, display-unit(s), film, slide, digital data display means, laser-created means, lenticular means, barrier means, microretarder means, hologram means, color filter means, grating means, LED(s) in various preferred combinations indicated by letters C, D, E, F, and G. Each of the different arrangements C, D, E, F, and G in FIG. 2A from C, D, E, F, G can use different a display-unit(s), display, or screen to present the 3D image and project it to any surface required according to known physics theories.

FIG. 2B shows further details of the construction of the embodiment of FIG. 1, including an image changing wheel 1-10, a replaceable image holding wheel 1-11, optical elements 1-11' and 1-11", and rotating/positioning means 1-12 and 1-13.

The invention claimed is:

1. An LED light device with a three-dimensional projection assembly, comprising:
   an optics means for projecting a three-dimensional image onto a surface external to the light device, said optics means including parts selected from the group consisting of a concave or convex lens, a lens assembly, a telescoping assembly, and additional parts for projecting said image onto the surface;

three-dimensional image forming means including an image display for displaying a first image and a hologram forming means for forming said first image into said three-dimensional image to be projected onto said surface; and a power source, circuitry and trigger means for triggering said at least one LED to provide at least one of a desired light function, timing, colors, brightness, and illumination, wherein the LED light device is arranged to be plugged into an electrical power outlet;

the improvement wherein:

said hologram forming means includes elements selected from the group consisting of a grating, a lenticular lens, slanted lenticular lens, switchable lenticular film, lenticular screen, and a parallax barrier, said image display is controlled by at least one of the following: a volumetric technique, multiplexed-2D to 3D technique, single image splitter, double image splitter, spatial-multiplexing, time division-multiplexing, tracking, 2D/3D switchable display controller, and said image display is selected from the group consisting of a multiplanar display, liquid crystal display (LCD), light emitting diode (LED) display, and other displays arranged to display at least one said first image for formation into the three-dimensional image by said hologram means.

2. An LED light device with a three-dimensional projection assembly, comprising:

an optics means for projecting a three-dimensional image onto a surface external to the light device, said optics means including parts selected from the group consisting of a concave or convex lens, a lens assembly, a telescoping assembly, and additional parts for projecting said image onto the surface;

three-dimensional image forming means including at least one of an image display for displaying a first image and a hologram means for forming said first image into a three dimensional image to be projected onto said surface; and a power source, circuitry and trigger means for triggering said at least one LED to provide at least one of a desired light function, timing, colors, brightness, and illumination, wherein the power source is a DC power source;

the improvement wherein:

said hologram means further includes elements selected from the group consisting of a grating, lenticular lens, slanted lenticular lens, switchable lenticular film, lenticular screen, and a parallax barrier, said image display is controlled by at least one of the following: a volumetric technique, multiplexed-2D to 3D technique, single image splitter, double image splitter, spatial-multiplexing, time division-multiplexing, tracking, 2D/3D switchable display controller, and said image display is selected from the group consisting of a multiplanar display, liquid crystal display (LCD), light emitting diode (LED) display, and other displays arranged to display at least one said first image for formation into the three-dimensional image by said hologram means.

3. A three-dimensional projection assembly for an LED light device that includes an LED light source, holographic or stereoscopic image display, and a projection means, wherein:

said holographic or stereoscopic image display is controlled by at least one of the following: a volumetric technique, multiplexed-2D to 3D technique, single image splitter, double image splitter, spatial-multiplexing, time division-multiplexing, tracking, 2D/3D switchable display controller, said holographic or stereoscopic image display is selected from the group consisting of a multiplanar display, liquid crystal display (LCD), light emitting diode (LED) display, and other displays arranged to display a three-dimensional image, said three-dimensional image being formed by a three-dimensional image forming means that includes elements selected from the group consisting of a grating, lenticular lens, slanted lenticular lens, switchable lenticular film, lenticular screen, and parallax barrier, and said projection means projecting said three-dimensional image onto a surface external to the LED light device.

* * * * *